(12) United States Patent
Houck et al.

(10) Patent No.: US 10,768,047 B2
(45) Date of Patent: Sep. 8, 2020

(54) SENSOR DEVICE AND METHODS OF USE (71) Applicant: VIAVI Solutions Inc., San Jose, CA (US)

(72) Inventors: William D. Houck, Santa Rosa, CA (US); Valton Smith, Daly City, CA (US)

(73) Assignee: VIAVI Solutions Inc., San Jose, CA (US)

( * ) Notice: Subject to any disclaimer, the term of this patent is extended or adjusted under 35 U.S.C. 154(b) by 95 days.

(21) Appl. No.: 16/102,259

(22) Filed: Aug. 13, 2018

(65) Prior Publication Data

US 2019/0250034 A1    Aug. 15, 2019

Related U.S. Application Data

(60) Provisional application No. 62/631,352, filed on Feb. 15, 2018.

(51) Int. Cl.
*G01J 3/02* (2006.01)
*G06T 7/11* (2017.01)
*G01J 3/28* (2006.01)
*G01J 3/36* (2006.01)
*H04N 5/345* (2011.01)

(52) U.S. Cl.
CPC ............ *G01J 3/0294* (2013.01); *G01J 3/2803* (2013.01); *G01J 3/2823* (2013.01); *G01J 3/36* (2013.01); *G06T 7/11* (2017.01); *H04N 5/3454* (2013.01); *G01J 2003/2806* (2013.01); *G01J 2003/2826* (2013.01); *G01J 2003/2836* (2013.01); *G06T 2207/20104* (2013.01)

(58) Field of Classification Search
CPC ...... G01J 3/0294; G01J 3/2803; G01J 3/2823; G01J 3/36; G01J 2003/2806; G01J 2003/2826; G01J 2003/2836; G06T 7/11; G06T 2207/20104; H04N 5/3454
See application file for complete search history.

(56) References Cited

U.S. PATENT DOCUMENTS

| | | | |
|---|---|---|---|
| 5,166,755 A | 11/1992 | Gat | |
| 2011/0033129 A1 | 2/2011 | Robinson | |
| 2012/0044394 A1* | 2/2012 | Komiya | H04N 5/3456 348/266 |

OTHER PUBLICATIONS

Extended European Search Report for Application No. EP19157024. 1, dated Jul. 18, 2019, 8 pages.

* cited by examiner

*Primary Examiner* — Jamil Ahmed
(74) *Attorney, Agent, or Firm* — Harrity & Harrity, LLP (57) ABSTRACT

A multispectral sensor device may include a sensor array comprising a plurality of channels and one or more processors to determine that a time-sensitive measurement is to be performed, wherein the time-sensitive measurement is to be performed using data collected by one or more channels of the plurality of channels; cause the data to be collected by a proper subset of channels, of the plurality of channels, wherein the proper subset of channels includes the one or more channels; and determine the time-sensitive measurement based on the data.

20 Claims, 8 Drawing Sheets

Measurement 1 is time-sensitive. Collect data only for channels 10, 11, 18, and 19 at high frequency. Determine measurement 1 based on collected data

130

Multispectral Sensor Device

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

Measurement 2 is not time-sensitive. Collect data for full sensor array. Determine measurement 2 based on collected data.

SENSOR DEVICE AND METHODS OF USE

BACKGROUND

A multispectral sensor device may be utilized to capture information. For example, the multispectral sensor device may capture information relating to a set of electromagnetic frequencies. The multispectral sensor device may include a set of sensor elements (e.g., optical sensors, spectral sensors, and/or image sensors) that capture the information. For example, an array of sensor elements may be utilized to capture information relating to multiple frequencies. A particular sensor element, of the sensor element array, may be associated with a filter that restricts a range of frequencies that are directed toward the particular sensor element. The filter may be associated with a particular bandwidth corresponding to a width of a spectral range that the filter passes toward the particular sensor element.

SUMMARY

In some possible implementations, a multispectral sensor device may include a sensor array comprising a plurality of channels and one or more processors to determine that a time-sensitive measurement is to be performed, wherein the time-sensitive measurement is to be performed using data collected by one or more channels of the plurality of channels; cause the data to be collected by a proper subset of channels, of the plurality of channels, wherein the proper subset of channels includes the one or more channels; and determine the time-sensitive measurement based on the data.

In some possible implementations, a method may include determining, by a multispectral sensor device, that a measurement is to be performed, wherein the measurement is to be performed using data collected by one or more channels of a plurality of channels of the multispectral sensor device, and wherein the measurement is associated with a time sensitivity; causing, by the multispectral sensor device, the data to be collected by a proper subset of channels, of the plurality of channels, wherein the proper subset of channels includes the one or more channels; and determining, by the multispectral sensor device, the measurement based on the data.

In some possible implementations, a non-transitory computer-readable medium may store one or more instructions that, when executed by one or more processors of a multispectral sensor device, cause the one or more processors to determine that a first measurement and a second measurement are to be performed, wherein the first measurement is to be performed using first data collected by one or more first channels of a plurality of channels of the multispectral sensor device, wherein the second measurement is to be performed using second data collected by one or more second channels of the plurality of channels, and wherein the first measurement is associated with a greater time sensitivity than the second measurement; cause the first data to be collected by a proper subset of channels, of the plurality of channels, wherein the proper subset of channels includes the one or more first channels; cause the second data to be collected, wherein the multispectral sensor device is configured to activate all channels of the plurality of channels to cause the second data to be collected; determine the first measurement based on the first data; and determine the second measurement based on the second data.

DETAILED DESCRIPTION

The following detailed description of example implementations refers to the accompanying drawings. The same reference numbers in different drawings may identify the same or similar elements.

Frame rates used for time-dependent optical measurements, such as those found in health monitoring applications (e.g., heartbeat, blood pressure, etc.), are sometimes in a range of 250 to 500 samples per second (sps). In a multispectral sensor that utilizes multiple pixel regions of a single image sensor, high readout speeds for the full sensor can be limited by the maximum data transfer rates achievable in the imaging system. This may be an image sensor readout architecture issue, and a system bus issue. High resolution, high speed sensors with high bit depth require complex circuits that increase the cost and size of a device. For sensors of good size, cost, bit depth, and responsivity, it may be difficult to achieve 250 sps at full resolution. In space-constrained consumer electronics applications where size and cost are design considerations, high frame rates at high resolution at high bit depth may be difficult to achieve.

Implementations described herein may maintain high resolution, high bit depth, and high frame rates without exceeding a data transfer rate of an imaging system by processing only certain regions of interest (ROIs) from a sensor image. For example, specific time-sensitive spectral channel measurements can be taken at high frame rate (e.g., at full ROI resolution and/or bit depth). The time-sensitive measurements may be used, for example, for processing time-dependent parameters, such as certain health parameters. The full spectral sensor can be operated at a slower rate for measurements that require the full spectral channel set, and/or at intermediate frame rates for any mixture of the data parameters that do not exceed the data bus rate of the spectrometer. ROI processing can be performed by a camera's sensor through partial scanning (for charge-coupled device (CCD)-based devices) or windowing (for complementary metal-oxide semiconductor (CMOS)-based devices). By performing ROI processing using partial scanning or windowing for time-sensitive or frequently-performed measurements, a data bus rate of the multispectral sensor may not be exceeded, which preserves the time dimension of the time-sensitive measurement, thereby improving measurement accuracy. Furthermore, some implementations described herein may be performed on a chip of the multispectral sensor device (e.g., before passing the data to a control device), which reduces latency and improves temporal measurement accuracy of the measurements.

Figure 1A:
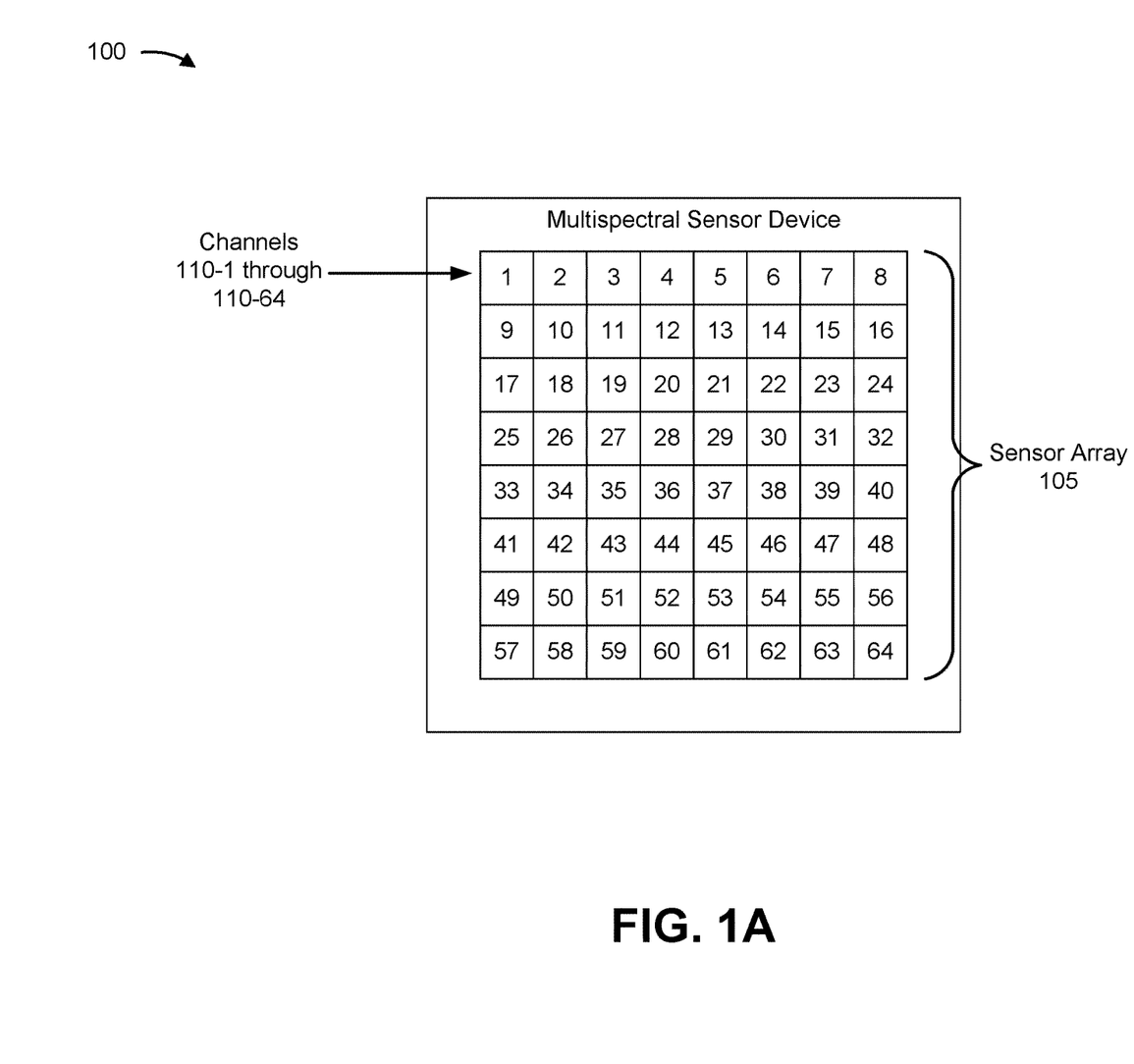
FIGS. 1A-1D are diagrams of an overview of an example implementation described herein.

FIGS. 1A-1D are diagrams of an overview of an example implementation 100 described herein. As shown in FIG. 1A, example implementation 100 may be performed by a multispectral sensor device, such as a multispectral sensor device employing a CMOS device or a CCD (e.g., multispectral sensor device 220 of FIG. 2). In some implementations, certain operations of example implementation 100 may be performed by another device of environment 200 of FIG. 2, such as control device 210.

As shown in FIG. 1, the multispectral sensor device may include a sensor array 105. As shown, sensor array 105 may include channels 110-1 through 110-64. For example, a sensor array may include multiple sensor elements configured to obtain information regarding multiple corresponding frequencies. Additionally, or alternatively, a sensor array may include multiple sensor elements configured to obtain information associated with a single frequency. A sensor element may correspond to a channel 110.

Figure 1B:
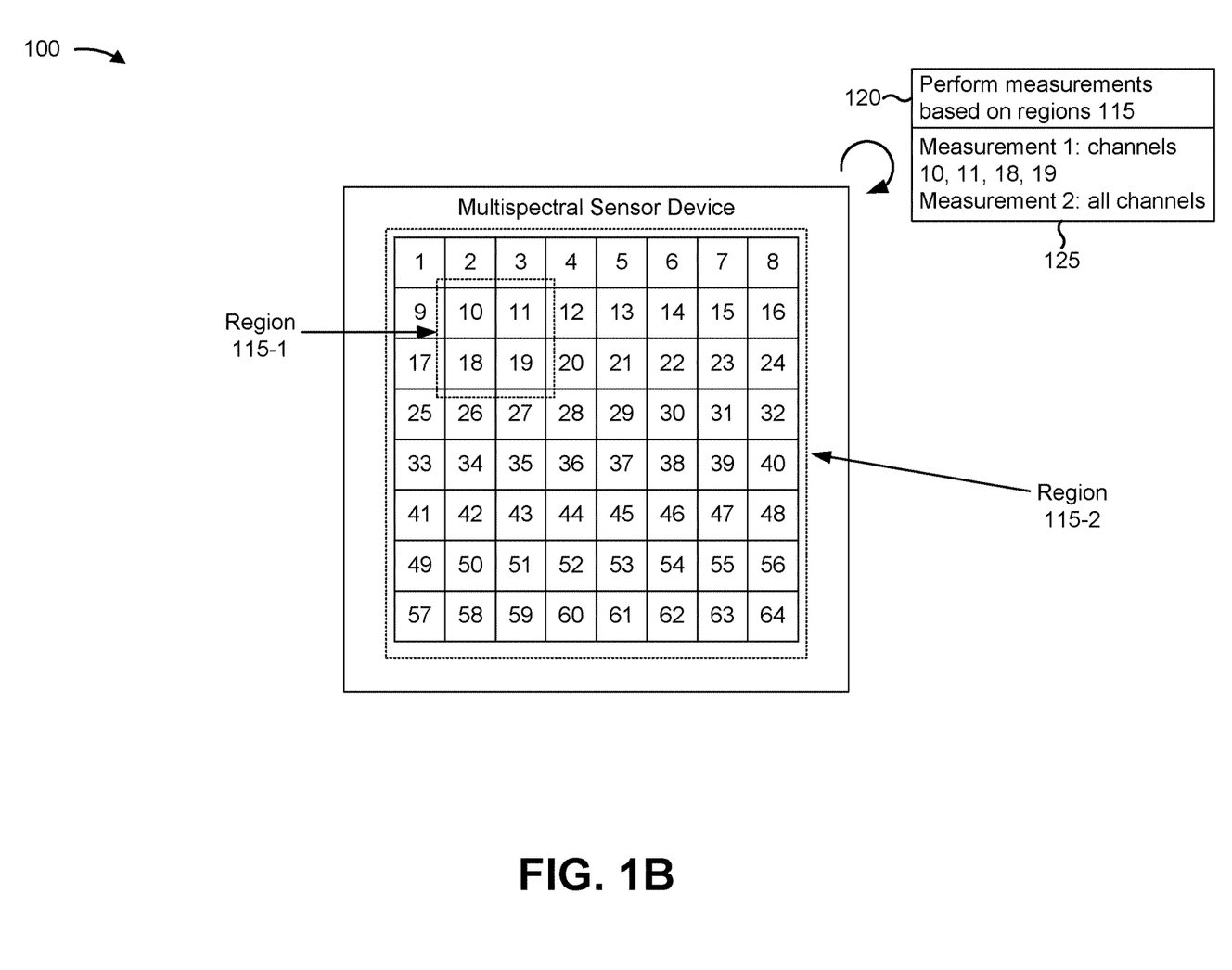

As shown in FIG. 1B, and by reference number 120, the multispectral sensor device may perform measurements based on the regions 115. The performance of the measurements is described in more detail in connection with FIGS. 1C and 1D, below. As shown by reference number 125, the multispectral sensor device may perform a measurement 1 using channels 10, 11, 18, and 19 of the sensor array 105. As further shown, the multispectral sensor device may perform a measurement 2 using all channels of the multispectral sensor device. Here, measurement 1 uses four channels, which may collectively be referred to as a pixel region or a region of interest (ROI). As shown, measurement 2 uses all channels of the sensor array 105. In some implementations, measurement 2 may use less than all channels of the sensor array 105.

For the purpose of example implementation 100, assume that measurement 1 is a time-sensitive measurement, and assume that measurement 2 is not a time-sensitive measurement. As used herein, a time-sensitive measurement may refer to a measurement that is associated with a threshold frame rate, a threshold data rate, a measurement for which an accurate time measurement is needed for accuracy, and/or the like. A non-time-sensitive measurement may refer to a measurement that is not associated with a threshold frame rate or data rate, a measurement for which an accurate time measurement is not needed, and/or the like. In some implementations, a time-sensitive measurement may be associated with a particular frame rate and/or resolution that would collectively exceed a bus data rate of the multispectral sensor device. When the bus data rate is exceeded, data may be queued, thereby losing a time dimension of the data. This may reduce the accuracy of some time-sensitive measurements.

Figure 1C:
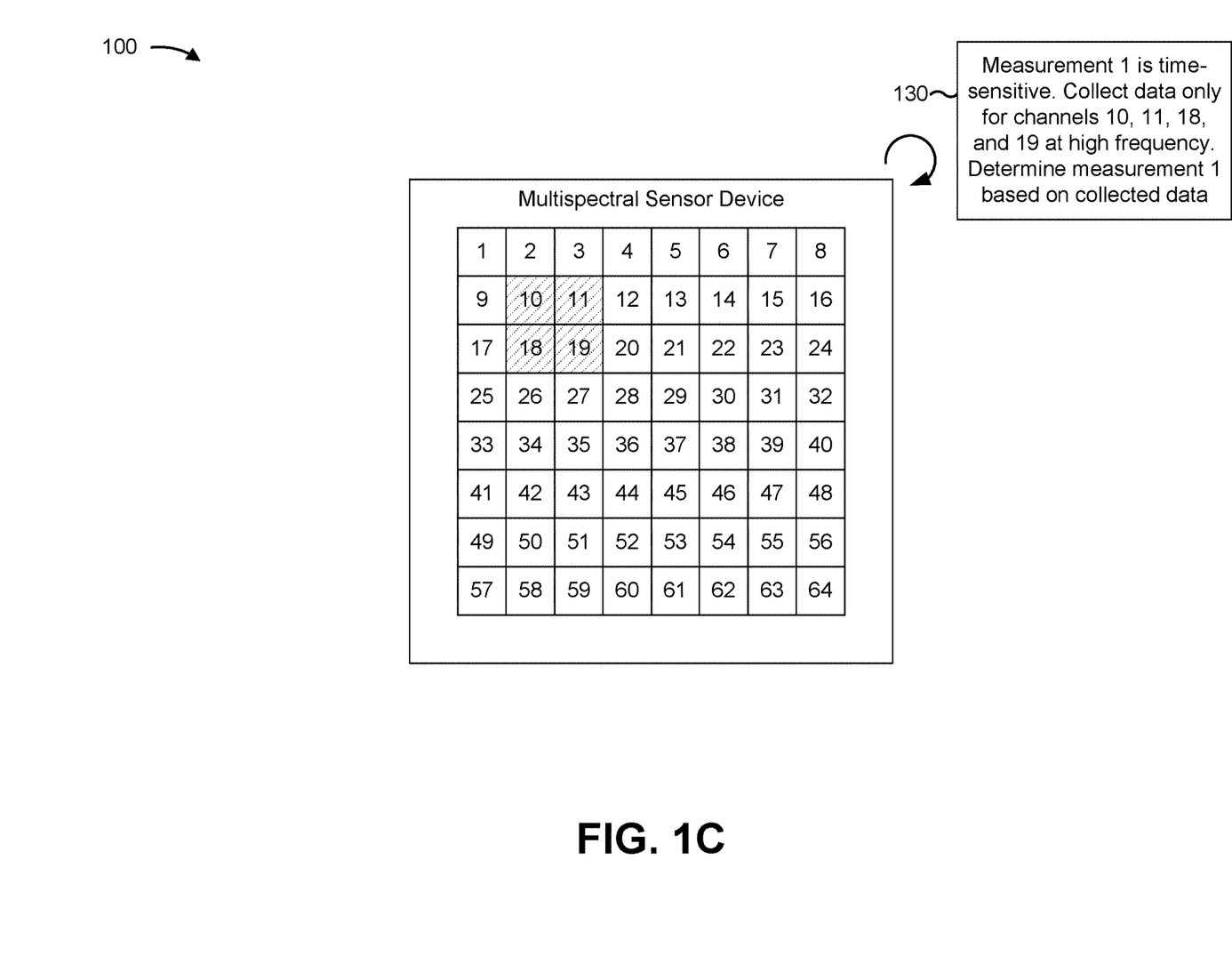

As shown in FIG. 1C, and by reference number 130, the multispectral sensor device may determine that measurement 1 is a time-sensitive measurement. As further shown, the multispectral sensor device may collect data only for the channels associated with measurement 1 (channels 10, 11, 18, and 19, shown by the diagonal hatching). In some implementations, the multispectral sensor device may collect the data using ROI windowing, as described in more detail below. In some implementations, the multispectral sensor device may collect the data using partial scanning of the sensor array 105, as is also described in more detail below.

In some implementations, such as when the multispectral sensor device includes a CCD-based device, the multispectral sensor device may collect the data using partial scanning of the sensor array 105. For example, partial scanning may be accomplished by performing a number of (e.g., consecutive) vertical shifts into the readout register and discarding the unwanted or unneeded charge (e.g., unwanted or unneeded data associated with channels other than channels 10, 11, 18, and 19). Without the need to output each pixel in the row, the vertical transfers can be done quickly relative to reading the full row, which provides an increase in frame rate due to the sensor outputting fewer rows in each frame. Once the ROI scan for measurement 1 has been achieved, the sensor array 105 may be operated normally, outputting pixels from the appropriate rows (as described in more detail in connection with FIG. 1D, below).

In some implementations, such as when the multispectral sensor device includes a CMOS-based device, the multispectral sensor device may collect the data using ROI windowing. For example, for some architectures of the CMOS sensor, both vertical and horizontal windowing can be performed. In some implementations, this allows a corresponding increase in frame rate, since pixel signals are sent in parallel through a bank of column amplifiers, followed by column analog to digital converters (A/Ds), and finally into a high-speed multiplexer that sends the digitized data off-chip. The integration of parallel on-chip A/Ds in a CMOS chip can allow for high pixel clocks with high frame rates.

In some implementations, windowing with CMOS sensors can extend beyond a single window to multiple windows by properly addressing the correct rows and columns of interest. With multiple windows or ROIs, the multispectral sensor device can improve utilization of the sensor output bandwidth for useful information without exceeding the bus data rate. In this way, the multispectral sensor device may improve measurement frequency and accuracy for time-sensitive measurements.

Figure 1D:
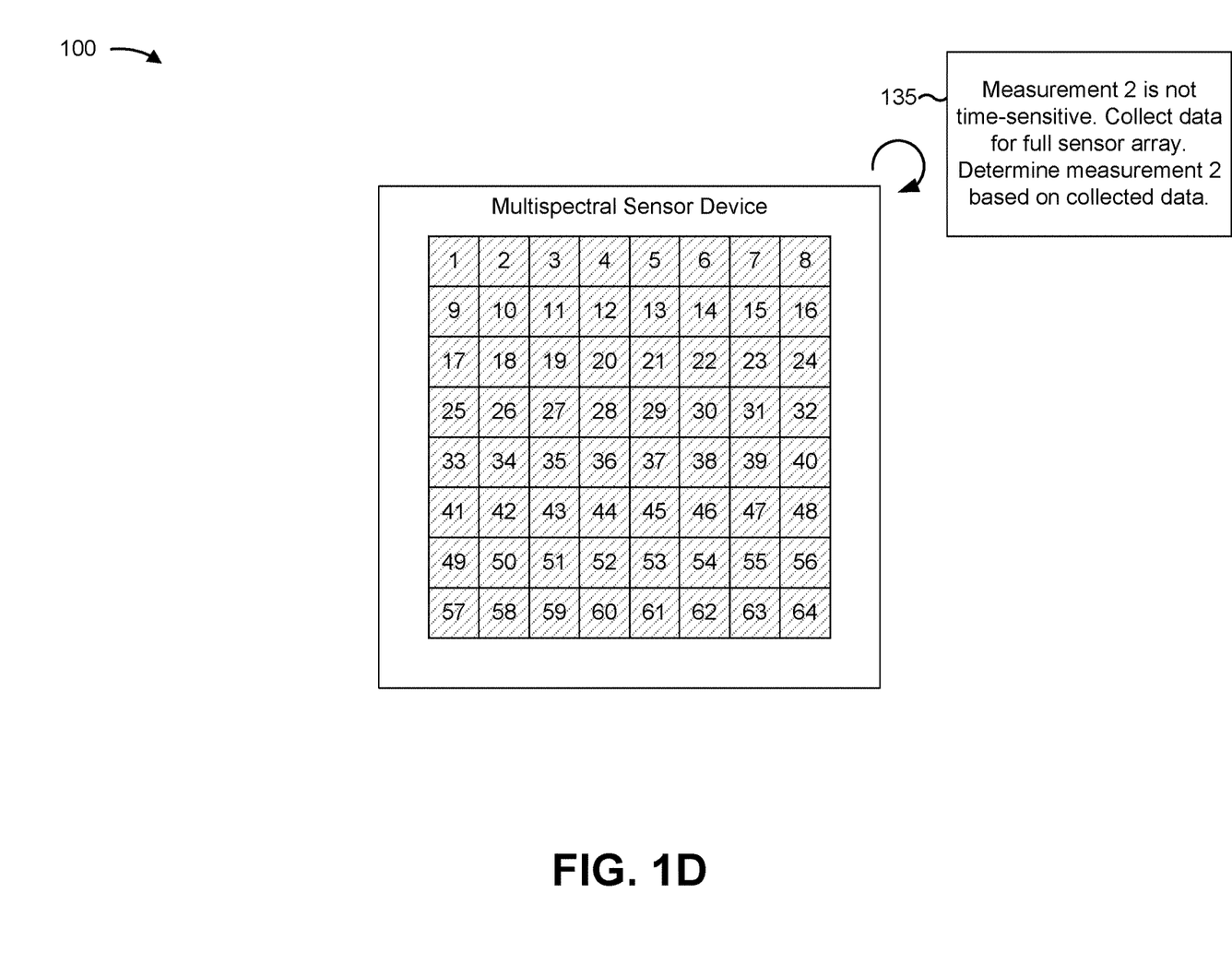

As shown in FIG. 1D, and by reference number 135, in some implementations, the multispectral sensor device may determine that measurement 2 is not time-sensitive. Accordingly, the multispectral sensor device may collect data using the full sensor array 105, and may determine measurement 2 based on the collected data. For example, the multispectral sensor device may collect data for each channel of sensor array 105. In some implementations, the multispectral sensor device may collect data for remaining channels other than channels 10, 11, 18, and/or 19, which may conserve resources that would otherwise be used to collect unnecessary data from channels 10, 11, 18, and/or 19. In some implementations, the multispectral sensor device may collect data at a full resolution for all channels of the sensor array 105, which enables more accurate determination of non-time-sensitive measurements.

As an example of the operations described in connection with FIGS. 1A-1D, above, consider the case of a 64-channel multispectral sensor achieved by integration of a monolithic multispectral filter onto a pixelated sensor (such as a common silicon CMOS image sensor) as a bio-monitoring device to measure heartbeat, blood pressure, SpO2, blood glucose, hydration, and/or other health parameters. Cardiopulmonary function parameters of heartbeat, blood pressure, and SpO2 may require time-sensitive (e.g., greater than 250 sps) measurements of time-dependent spectral signals in a small number of wavelengths. Utilizing the multispectral ROI windowing technique, data in specific channels corresponding to the small number of wavelengths can be determined at a speed sufficient to meet the temporal sampling requirements and calculate the necessary measurements. When determination of the time-sensitive measurements has been completed, the multispectral sensor may perform a full sensor readout that captures the remaining channels of data in a full readout (e.g., of all 64 channels). This information can be used to determine other spectral health parameters such as blood glucose, hydration, etc. that are not time-dependent but may have need of highly-resolved spectral content.

In this way, the multispectral ROI windowing technique achieves high resolution, high bit depth and high frame rate that would otherwise necessitate complex architectures that would add significant cost and size to a device. For example, other techniques, such as stacking wafers to integrate specialized readout circuits directly to each pixel, or the creation of specialized circuitry to run very fast data collection may not be suitable for achieving low cost and high manufacturability. Additionally, without ROI techniques to discard the extra data that is not useful, large amounts of data would need to be processed before a useful signal could be calculated and reported back to the user, thus destroying the time-sensitive aspects of the measurements.

Example implementation 100 is described from the perspective of a two-dimensional sensor array. However, implementations described herein can be applied for three-dimensional sensor arrays as well. For example, the regions of interest for such a sensor array could be one-dimensional (e.g., a single channel or a line of channels), two-dimensional (e.g., a layer of channels), or three dimensional (e.g., two or more layers of one or more channels).

As indicated above, FIGS. 1A-1D are provided merely as an example. Other examples are possible and may differ from what was described with regard to FIGS. 1A-1D.

Figure 2:
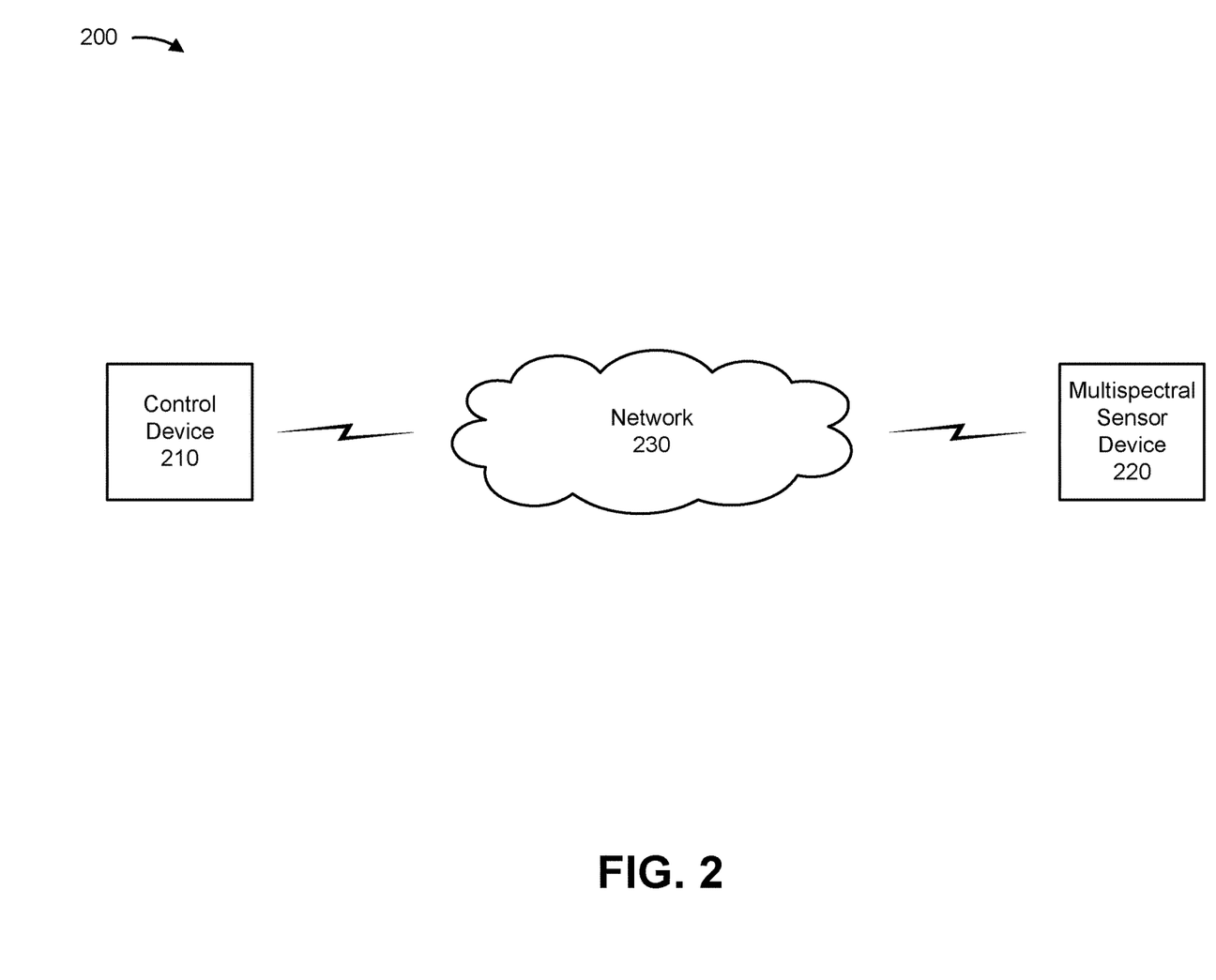
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a control device 210, a multispectral sensor device 220, and a network 230. Devices of environment 200 may interconnect via wired connections, wireless connections, or a combination of wired and wireless connections.

Control device 210 includes one or more devices capable of storing, processing, and/or routing information associated with multispectral sensing. For example, control device 210 may include a server, a computer, a wearable device, a cloud computing device, and/or the like. In some implementations, control device 210 may be associated with a particular multispectral sensor device 220. In some implementations, control device 210 may be associated with multiple multispectral sensor devices 220. In some implementations, control device 210 may receive information from and/or transmit information to another device in environment 100, such as multispectral sensor device 220.

Multispectral sensor device 220 includes a device capable of performing a measurement of light directed toward multispectral sensor device 220. For example, multispectral sensor device 220 may include an image sensor, a multispectral sensor, and/or the like that may perform a sensor measurement of light directed toward multispectral sensor device 220. Multispectral sensor device 220 may utilize one or more sensor technologies, such as a complementary metal-oxide-semiconductor (CMOS) technology, a charge-coupled device (CCD) technology, and/or the like. Multispectral sensor device 220 may include multiple sensor elements (e.g., an array of sensor elements—referred to as a sensor array) each configured to obtain information. A sensor element may correspond to a channel, such as channel 115 described in FIG. 1A.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
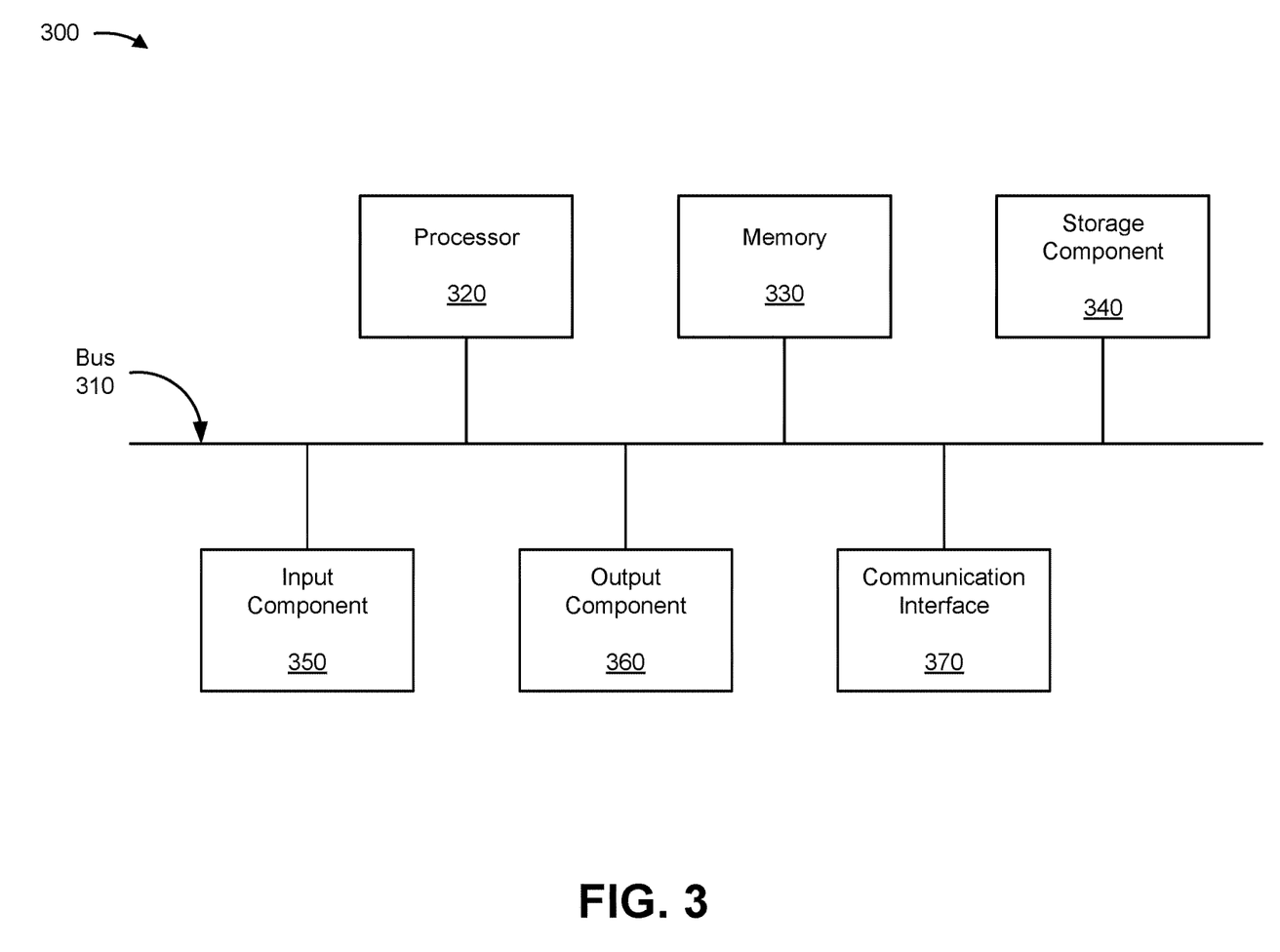
FIG. 3 is a diagram of example components of one or more devices of FIG. 2.

FIG. 3 is a diagram of example components of a device 300. Device 300 may correspond to control device 210 and/or multispectral sensor device 220. In some implementations, control device 210 and/or multispectral sensor device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
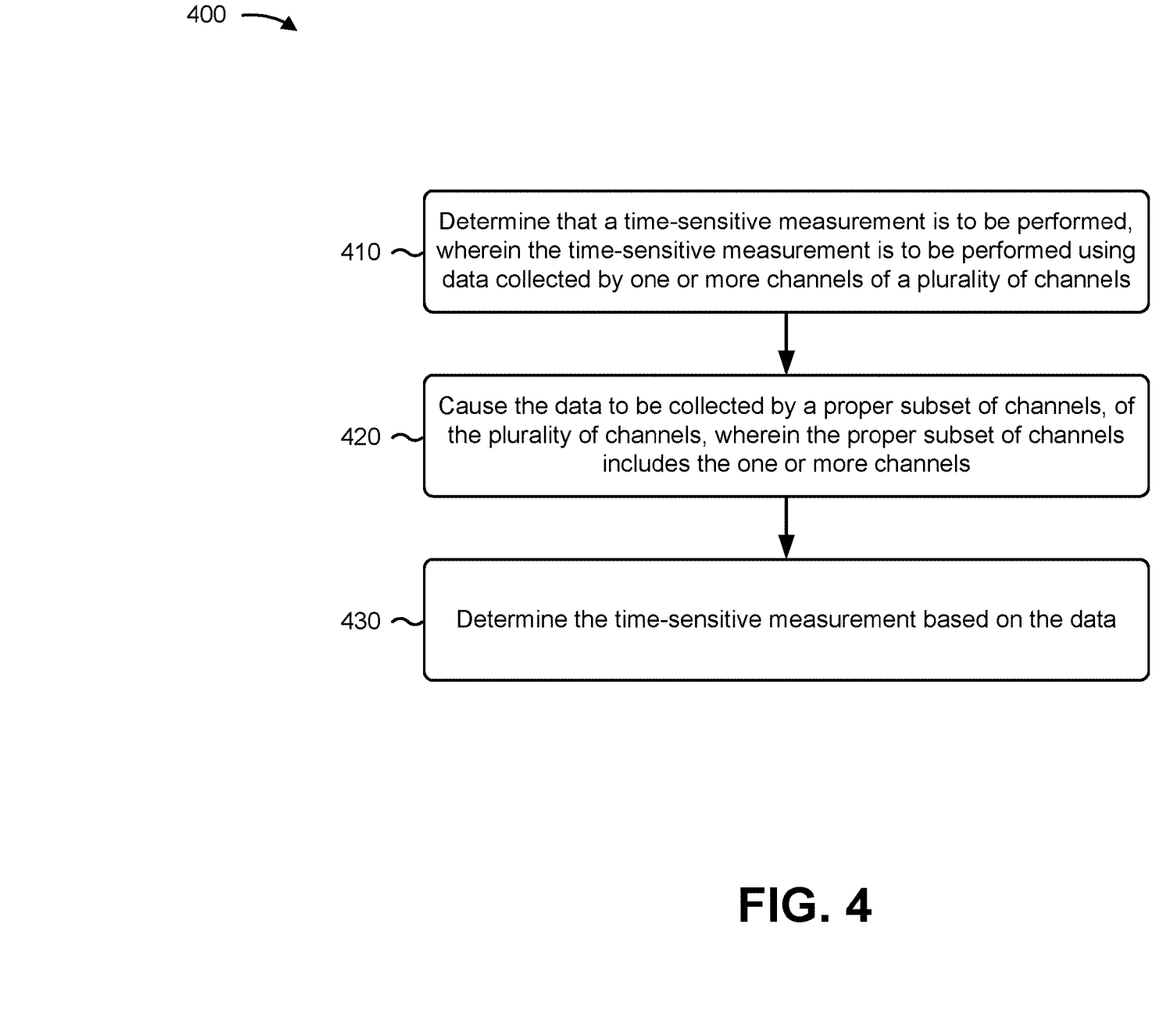
FIG. 4 is a flow chart of an example process for region-of-interest (ROI) processing for time-sensitive measurement.

FIG. 4 is a flow chart of an example process 400 for ROI windowing for multispectral measurement. In some implementations, one or more process blocks of FIG. 4 may be performed by multispectral sensor device 220. In some implementations, one or more process blocks of FIG. 4 may be performed by another device or a group of devices separate from or including multispectral sensor device 220, such as control device 210.

As shown in FIG. 4, process 400 may include determining that a time-sensitive measurement is to be performed, wherein the time-sensitive measurement is to be performed using data collected by one or more channels of a plurality of channels (block 410). For example, multispectral sensor device 220 (e.g., using processor 320 and/or the like) may determine that a time-sensitive measurement is to be performed. The time-sensitive measurement may be performed using data collected by one or more channels of a sensor array (e.g., in a region of interest associated with the time-sensitive measurement). In some implementations, determining the measurement may be performed automatically by multispectral sensor device 220 (e.g., based on feedback). In some implementations, the measurement may be configured (e.g., a particular measurement requires 250 sps).

As further shown in FIG. 4, process 400 may include causing the data to be collected by a proper subset of channels, of the plurality of channels, wherein the proper subset of channels includes the one or more channels (block 420). For example, multispectral sensor device 220 (e.g., using processor 320) may cause the data to be collected by a proper subset of channels (e.g., less than all channels) of the plurality of channels. The proper subset of channels may include the one or more channels in the region of interest. In some implementations, multispectral sensor device 220 may cause the data to be collected using an ROI windowing approach or a partial scanning approach, as described in more detail elsewhere herein.

As further shown in FIG. 4, process 400 may include determining the time-sensitive measurement based on the data (block 430). For example, multispectral sensor device 220 (e.g., using processor 320) may determine the time-sensitive measurement based on the data. In this way, a data bus rate of multispectral sensor device 220 is not exceeded for the time-sensitive measurement. In some implementations, multispectral sensor device 220 may provide the data to another device (e.g., control device 210) that may determine the data.

Process 400 may include additional implementations, such as any single implementation or any combination of implementation described below and/or in connection with one or more other processes described elsewhere herein.

In some implementations, the proper subset of channels includes only the one or more channels. In some implementations, the proper subset of channels includes one or more rows of sensors, wherein the one or more rows include the one or more channels. In some implementations, multispectral sensor device 220 may discard data other than the data collected by the one or more channels. In some implementations, multispectral sensor device 220 may cause the data to be collected by the proper subset of channels based on a time sensitivity of the time-sensitive measurement. In some implementations, the time-sensitive measurement is a first measurement and the data is first data. Multispectral sensor device 220 may determine that a second measurement is to be performed, wherein the second measurement is associated with a less stringent time sensitivity than the first measurement; cause second data to be collected by all channels of the plurality of channels; and perform the second measurement using at least part of the second data. In some implementations, the multispectral sensor device may perform multiple iterations of the first measurement and the second measurement, wherein the first measurement is performed more frequently than the second measurement. In some implementations, the first measurement is determined with less latency than the second measurement. In some implementations, the first measurement is performed more frequently than the second measurement.

In some implementations, the sensor array includes at least one of a charge-coupled device or a complementary metal-oxide semiconductor device. In some implementations, the time-sensitive measurement is for a biological or medical value.

In some implementations, the multispectral sensor device 220 includes a complementary metal-oxide semiconductor device. The multispectral sensor device 220 may perform vertical and horizontal windowing so that the data is collected only by the one or more channels. In some implementations, the multispectral sensor device 220 includes a charge-coupled device. The multispectral sensor device may perform one or more consecutive vertical shifts into a readout register and discard data other than the data to be collected. In some implementations, particular data from the one or more rows is not associated with the one or more channels and the particular data is dropped for determining the measurement.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
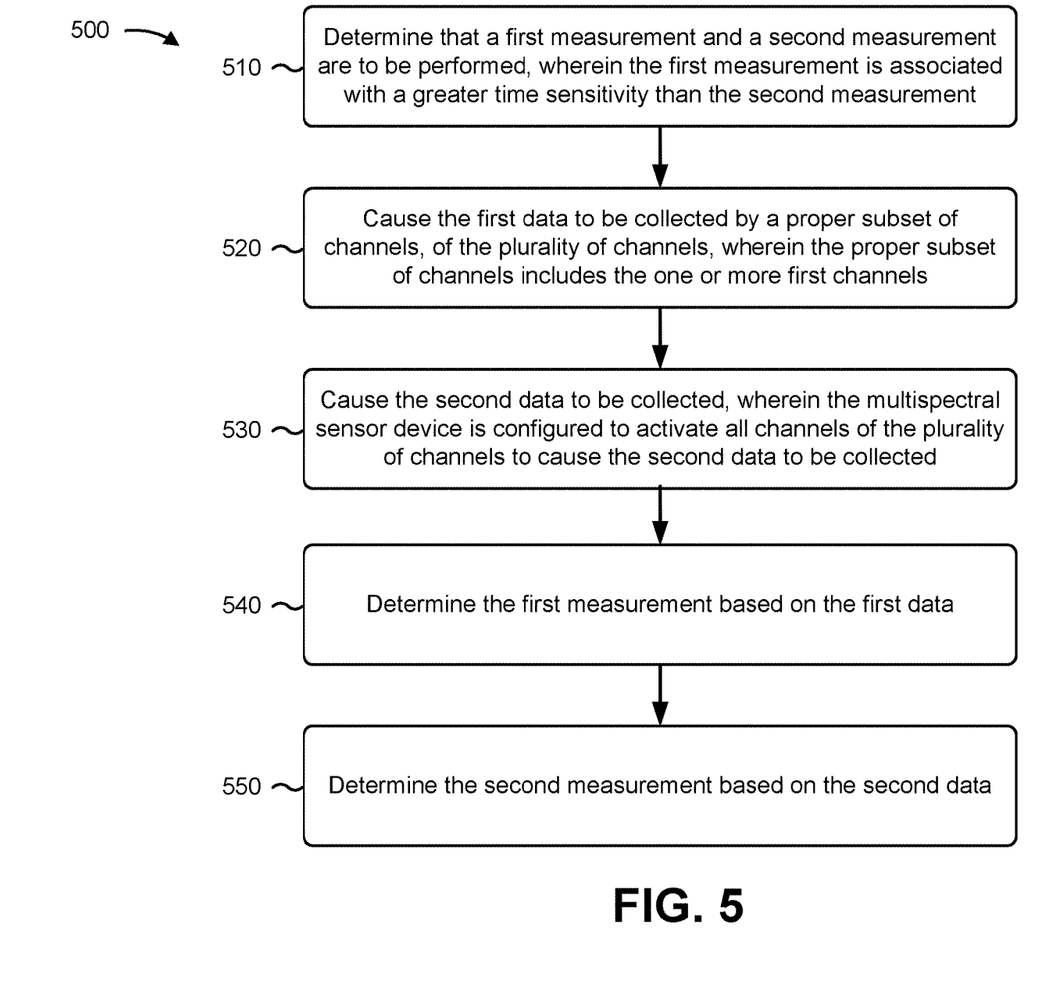
FIG. 5 is a flow chart of another example process for region-of-interest (ROI) processing for time-sensitive measurement.

FIG. 5 is a flow chart of another example process 500 for ROI windowing for multispectral measurement. In some implementations, one or more process blocks of FIG. 5 may be performed by multispectral sensor device 220. In some implementations, one or more process blocks of FIG. 5 may be performed by another device or a group of devices separate from or including multispectral sensor device 220, such as control device 210.

As shown in FIG. 5, process 500 may include determining that a first measurement and a second measurement are to be performed, wherein the first measurement is associated with a greater time sensitivity than the second measurement (block 510). For example, multispectral sensor device 220 (e.g., using processor 320) may determine that a first measurement and a second measurement are to be performed. The first measurement may be associated with a greater time sensitivity than the second measurement. In some implementations, the first measurement may be associated with a higher data rate, frame rate, and/or resolution than the second measurement.

As further shown in FIG. 5, process 500 may include causing the first data to be collected by a proper subset of channels, of the plurality of channels, wherein the proper subset of channels includes the one or more first channels (block 520). For example, multispectral sensor device 220 (e.g., using processor 320) may cause the first data to be collected by a proper subset of channels of the plurality of channels. The proper subset of channels may include a region of interest corresponding to the one or more first channels.

As further shown in FIG. 5, process 500 may include causing the second data to be collected, wherein multispectral sensor device 220 is configured to activate all channels of the plurality of channels to cause the second data to be collected (block 530). For example, multispectral sensor device 220 (e.g., using processor 320) may cause the second data to be collected. Multispectral sensor device 220 may activate all channels, of the plurality of channels, to cause the second data to be collected.

As further shown in FIG. 5, process 500 may include determining the first measurement based on the first data (block 540). For example, multispectral sensor device 220 (e.g., using processor 320) may determine the first measurement based on the first data. In some implementations, multispectral sensor device 220 may provide the first data to another device (e.g., control device 210) for determination of the first measurement.

As further shown in FIG. 5, process 500 may include determining the second measurement based on the second data (block 550). For example, multispectral sensor device 220 (e.g., using processor 320) may determine the second measurement based on the second data. In some implementations, multispectral sensor device 220 may provide the second data to another device (e.g., control device 210) for determination of the second measurement.

Process 500 may include additional implementations, such as any single implementation or any combination of implementation described below and/or in connection with one or more other processes described elsewhere herein.

In some implementations, multispectral sensor device 220 may perform multiple iterations of the first measurement and the second measurement, wherein the first measurement is performed more frequently than the second measurement. In some implementations, the first measurement is determined with less latency than the second measurement. In some implementations, the multispectral sensor device includes a charge-coupled device or a complementary metal-oxide semiconductor device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, the multispectral ROI windowing technique achieves high resolution, high bit depth and high frame rate that would otherwise necessitate complex architectures that would add significant cost and size to a device. For example, other techniques, such as stacking wafers to integrate specialized readout circuits directly to each pixel, or the creation of specialized circuitry to run very fast data collection may not be suitable for achieving low cost and high manufacturability. Additionally, without ROI techniques to discard the extra data that is not useful, large amounts of data would need to be processed before a useful signal could be calculated and reported back to the user, thus destroying the time-sensitive aspects of the measurements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A multispectral sensor device, comprising:
a sensor array comprising a plurality of channels; and
one or more processors to:
    determine that a time-sensitive measurement is to be performed,
        wherein the time-sensitive measurement is to be performed using data collected by one or more channels of the plurality of channels,
        wherein the time-sensitive measurement is associated with a threshold frame rate, and
        wherein a non-time-sensitive measurement is not associated with the threshold frame rate;
    cause the data to be collected by a proper subset of channels, of the plurality of channels, based on a time sensitivity of the time-sensitive measurement, wherein the proper subset of channels includes the one or more channels; and
    determine the time-sensitive measurement based on the data.

2. The multispectral sensor device of claim 1, wherein the proper subset of channels includes only the one or more channels.

3. The multispectral sensor device of claim 1, wherein the proper subset of channels includes one or more rows of sensors, wherein the one or more rows include the one or more channels.

4. The multispectral sensor device of claim 3, wherein the one or more processors are to:
discard data other than the data collected by the one or more channels.

5. The multispectral sensor device of claim 1, wherein the time-sensitive measurement is a first measurement and the data is first data; and
wherein the one or more processors are to:
    determine that a second measurement is to be performed,
        wherein the second measurement is associated with a less stringent time sensitivity than the first measurement, and
        wherein the second measurement is the non-time-sensitive measurement;
    cause second data to be collected by all channels of the plurality of channels; and
    perform the second measurement using at least part of the second data.

6. The multispectral sensor device of claim 1,
wherein the time-sensitive measurement is a first measurement,
wherein the non-time-sensitive measurement is a second measurement,
wherein the one or more processors are further to:
    perform multiple iterations of the first measurement and the second measurement, and
    wherein the first measurement is performed more frequently than the second measurement.

7. The multispectral sensor device of claim 1, wherein the sensor array includes at least one of a charge-coupled device or a complementary metal-oxide semiconductor device.

8. The multispectral sensor device of claim 1, wherein the time-sensitive measurement is a first measurement and the data is first data; and
wherein the one or more processors are to:
    determine that a second measurement is to be performed,
        wherein the second measurement is associated with a more stringent time sensitivity than the first measurement;
    cause second data to be collected by a set of channels, of the plurality of channels, that includes fewer channels than the proper subset of channels; and
    perform the second measurement using at least part of the second data.

9. A method, comprising:
determining, by a multispectral sensor device, that a measurement is to be performed,
    wherein the measurement is to be performed using data collected by one or more channels of a plurality of channels of the multispectral sensor device, and
    wherein the measurement is associated with a time sensitivity;
causing, by the multispectral sensor device, the data to be collected by a proper subset of channels, of the plurality of channels, based on a time sensitivity of the measurement,
    wherein the proper subset of channels includes the one or more channels,
    wherein the time sensitivity indicates that the measurement is a time-sensitive measurement when the measurement is associated with a threshold frame rate, and
    wherein the time sensitivity indicates that the measurement is a non-time-sensitive measurement when the measurement is not associated with the threshold frame rate; and
determining, by the multispectral sensor device, the measurement based on the data.

10. The method of claim 9, wherein the multispectral sensor device includes a complementary metal-oxide semiconductor device, and
wherein causing the data to be collected further comprises performing vertical and horizontal windowing so that the data is collected only by the one or more channels.

11. The method of claim 9, wherein the multispectral sensor device includes a charge-coupled device,
wherein causing the data to be collected further comprises performing one or more consecutive vertical shifts into a readout register; and
discarding data other than the data to be collected.

12. The method of claim 9, wherein particular data from one or more rows of the plurality of channels, is not associated with the one or more channels, and
wherein the particular data is dropped for determining the measurement.

13. The method of claim 9, wherein the measurement is a first measurement and the data is first data; and
wherein the method further comprises:
    determining that a second measurement is to be performed,
        wherein the second measurement is associated with a less stringent time sensitivity than the first measurement;

causing second data to be collected by all channels of the plurality of channels; and performing the second measurement using at least part of the second data.

14. The method of claim 13, wherein the first measurement is determined with less latency than the second measurement.

15. The method of claim 13, wherein multiple iterations of the first measurement and the second measurement are performed, and wherein the first measurement is performed more frequently than the second measurement.

16. A non-transitory computer-readable medium storing instructions, the instructions comprising:

one or more instructions that, when executed by one or more processors of a multispectral sensor device, cause the one or more processors to:

determine that a first measurement and a second measurement are to be performed, wherein the first measurement is to be performed using first data collected by one or more first channels of a plurality of channels of the multispectral sensor device, wherein the second measurement is to be performed using second data collected by one or more second channels of the plurality of channels, and wherein the first measurement is associated with a greater time sensitivity than the second measurement;

cause the first data to be collected by a proper subset of channels, of the plurality of channels, based on a time sensitivity of the first measurement, wherein the proper subset of channels includes the one or more first channels;

cause the second data to be collected, wherein the multispectral sensor device is configured to activate all channels of the plurality of channels to cause the second data to be collected;

determine the first measurement based on the first data; and determine the second measurement based on the second data, wherein the first measurement is a time-sensitive measurement that is associated with a threshold frame rate, and wherein the second measurement is a non-time-sensitive measurement that is not associated with the threshold frame rate.

17. The non-transitory computer-readable medium of claim 16, where the one or more instructions, when executed by the one or more processors, further cause the one or more processors to:

perform multiple iterations of the first measurement and the second measurement, wherein the first measurement is performed more frequently than the second measurement.

18. The non-transitory computer-readable medium of claim 16, wherein the first measurement is determined with less latency than the second measurement.

19. The non-transitory computer-readable medium of claim 16, wherein the multispectral sensor device includes a charge-coupled device or a complementary metal-oxide semiconductor device.

20. The non-transitory computer-readable medium of claim 16, wherein the time-sensitive measurement is associated with a threshold data rate, and wherein the non-time-sensitive measurement is not associated with the threshold data rate.

* * * * *